Patented Mar. 8, 1932

1,848,513

UNITED STATES PATENT OFFICE

CHARLES WILLIAM BUNN, OF NORTHWICH, ENGLAND, ASSIGNOR TO IMPERIAL CHEMICAL INDUSTRIES LIMITED, OF LONDON, ENGLAND, A BRITISH COMPANY

MANUFACTURE OF AMMONIUM CHLORIDE CRYSTALS

No Drawing. Application filed February 8, 1930, Serial No. 427,067, and in Great Britain February 23, 1929.

This invention relates to an improved process of manufacturing ammonium chloride crystals and to the product so obtained.

According to the invention I crystallize with continual agitation an aqueous solution of ammonium chloride containing a small proportion of a substance which can form mixed crystals or a double salt therewith. Preferably, I add to the solution quite small quantities, for example, of the order of 0.1% of a chloride forming mixed crystals with ammonium chloride, such as chloride of manganese, iron, cobalt, nickel, or copper.

The product so obtained is of novel appearance, consisting of small, substantially spherical crystals, and is very valuable because of its non-caking properties, and free flowing nature.

Example

A saturated solution of ammonium chloride containing 0.1% of manganous chloride (calculated on the ammonium chloride) is evaporated and allowed to crystallize with continual agitation. Small crystals are obtained which are practically spherical in shape. This arises from the fact that the crystals are deposited in the form of regular icositetrahedra, whose corners are worn off by the agitation.

I declare that what I claim is:—

1. As a new product, substantially spherical crystals of ammonium chloride in the form of rounded icositetrahedra containing a small proportion of a foreign substance adapted to influence crystal growth.

2. The process of obtaining uniform small substantially spherical crystals of ammonium chloride by crystallization with agitation of a solution of ammonium chloride containing a small proportion of a salt of a metal selected from the group consisting of manganese, iron, cobalt, nickel and copper.

3. A process as claimed in claim 2 in which manganous chloride is added.

4. A process as claimed in claim 2 in which about 0.1% of added substance is present.

In witness whereof, I have hereunto signed my name this 28th day of November, 1930.

CHARLES WILLIAM BUNN.